(12) United States Patent
Gkortsas et al.

(10) Patent No.: US 11,220,897 B2
(45) Date of Patent: Jan. 11, 2022

(54) EVALUATING CASING CEMENT USING AUTOMATED DETECTION OF CLINGING COMPRESSION WAVE (P) ARRIVALS

(71) Applicant: Schlumberger Technology Corporation, Sugar Land, TX (US)

(72) Inventors: Vasileios-Marios Gkortsas, Boston, MA (US); Sandip Bose, Brookline, MA (US); Smaine Zeroug, Lexington, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/046,967

(22) PCT Filed: Apr. 12, 2019

(86) PCT No.: PCT/US2019/027195
§ 371 (c)(1),
(2) Date: Oct. 12, 2020

(87) PCT Pub. No.: WO2019/200242
PCT Pub. Date: Oct. 17, 2019

(65) Prior Publication Data
US 2021/0032973 A1    Feb. 4, 2021

Related U.S. Application Data

(60) Provisional application No. 62/656,662, filed on Apr. 12, 2018.

(51) Int. Cl.
*E21B 47/005* (2012.01)
*G01V 1/50* (2006.01)

(52) U.S. Cl.
CPC .............. *E21B 47/005* (2020.05); *G01V 1/50* (2013.01); *E21B 2200/22* (2020.05)

(58) Field of Classification Search
CPC ...... E21B 47/005; E21B 2200/22; G01V 1/50
See application file for complete search history.

(56) References Cited

U.S. PATENT DOCUMENTS 5,859,811 A    1/1999 Miller et al.
9,534,487 B2   1/2017 Zeroug et al.
(Continued)

FOREIGN PATENT DOCUMENTS

WO      2016187242 A1    11/2016

OTHER PUBLICATIONS

Morris et al., "Application of Enhanced Ultrasonic Measurements for Cement and Casing Evaluation", SPE/IADC Drilling Conference held in Amsterdam, The Netherlands, Feb. 20-22, 2007. (Year: 2007).*
Van Kuijk, R. et al., "A Novel Ultrasonic Cased-Hole Imager for Enhanced Cement Evaluation", paper 10546-PP, presented at the International Petroleum Technology Conference held in Doha, Qatar, Nov. 21-23, 2005, pp.
(Continued)

*Primary Examiner* — Regis J Betsch
(74) *Attorney, Agent, or Firm* — Trevor G. Grove (57) ABSTRACT

Cement in a wellbore is evaluated by using cement evaluation tools to obtain ultrasonic image information and flexural wave image information. Flexural wave imager waveforms are applied to a trained machine learning system that predicts the presence or lack thereof of a clinging P as a function of depth and azimuth, while the ultrasonic imager impedance maps are applied to a trained machine learning system that identifies galaxy patterns for depths and azimuths, indicating the presence of a third interface echo (TIE) close to the casing. Locations of clinging Ps are compared to locations of galaxy patterns to identify when a TIE could cause a false clinging P determination. Where a disambigu- (Continued)

ated clinging P is found, contaminated cement is identified that may also locate the top of the cement in the annulus.

13 Claims, 12 Drawing Sheets

(56) References Cited

U.S. PATENT DOCUMENTS

| | | | |
|---|---|---|---|
| 9,784,875 | B2 | 10/2017 | Zeroug et al. |
| 10,995,606 | B2* | 5/2021 | Skataric ................ E21B 47/005 |
| 2014/0052376 | A1 | 2/2014 | Guo et al. |
| 2015/0198732 | A1* | 7/2015 | Zeroug ................ E21B 47/005 |
| | | | 367/35 |
| 2015/0218930 | A1 | 8/2015 | Zeroug et al. |
| 2017/0176622 | A1* | 6/2017 | Lemarenko ............. G01V 1/50 |
| 2018/0149019 | A1* | 5/2018 | Bose ..................... E21B 47/005 |

OTHER PUBLICATIONS

Zeroug, S. et al., "Ultrasonic Leaky-Lamb Wave Imaging Through a Highly Contrasting Layer", 2003 IEEE Symposium on Ultrasonics, 2003, 1, pp. 794-798.

Sinha, B. K. et al., "Geophysical Prospecting Using Sonics and Ultrasonics", Wiley Encyclopedia of Electrical and Electronics Engineering, Ed. J. G. Webster, 1999, pp. 340-365.

Hayman, A. J. et al., "High-Resolution Cementation and Corrosion Imaging by Ultrasound", SPWLA 32nd Annual Logging Symposium, Jun. 16-19, 1991, 25 pages.

International Search Report and Written Opinion of International Application No. PCT/US2019/027195 dated Aug. 7, 2019, 14 pages.

International Peliminary Report on Patentability of International Application No. PCT/US2019/027195 dated Oct. 22, 2020, 6 pages.

* cited by examiner

EVALUATING CASING CEMENT USING AUTOMATED DETECTION OF CLINGING COMPRESSION WAVE (P) ARRIVALS

CROSS-REFERENCE TO RELATED APPLICATIONS

This application claims the benefit of priority under 35 U.S.C. 119(e) to U.S. Provisional Patent Application No. 62/656,662, filed Apr. 12, 2018, the entire contents of which are incorporated herein by reference.

FIELD

The subject disclosure relates to well integrity. More specifically, the subject disclosure relates to evaluation of cement in a wellbore annulus.

BACKGROUND

Cement evaluation in cased oil and gas wells is conducted by lowering an ultrasonic tool that implements imaging through steel casing based on the casing (quasi-Lamb) modes including a thickness-mode-dominated measurement through a pulse-echo modality, and a flexural-mode-dominated measurement through a pitch-catch modality. See Kuijk et al., "A Novel Ultrasonic Cased-Hole Imager for Enhanced Cement Evaluation", paper 10546-PP, presented at the International Petroleum Technology Conference held in Doha, Qatar, 21-23 November 2005 and Zeroug et al., "Ultrasonic leaky-lamb wave imaging through a highly contrasting layer", Proceedings 2003 IEEE Ultrasonic Symposium, pages 794-798, (2003).

The service is important to ascertain well integrity before proceeding to putting the well into production. The measurement data is processed to extract information about the properties of the annular fill behind casing: either cement, mud, mud-contaminated cement, or gas. The pulse-echo resonance data is inverted for a measure of the annular impedance, while the dispersive flexural mode data yields a modal attenuation of the casing-propagating signal across two receivers. Both measurements are combined and interpreted in terms of a solid versus liquid or gas annular fill. When the annular fill is comprised of a solid with a compressional wave velocity that intersects the dispersive flexural mode phase velocity curve within the signal frequency bandwidth, phase matching to a headwave in the annulus occurs and an additional contribution that follows closely the arrival from within the casing is observed: a feature referred to as a "clinging P" (with "P" referring to P- or compressional waves).

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter. This subject disclosure relates to a method for evaluating cement surrounding a casing in a particular wellbore. The method includes obtaining flexural wave training data from various wellbores having cement surrounding casings; collecting the flexural wave training data to obtain training density displays; training a first machine learning processor to identify clinging Ps based on the training density displays; using at least one wellbore tool in the wellbore to obtain flexural wave test data; processing the flexural wave test data to obtain a density display for the wellbore; applying the density display for the wellbore to the first machine learning processor to locate a potential clinging P for the wellbore; and identifying a potential contaminated cement location and/or top of cement location for the cement of the wellbore based on the location of the potential clinging P.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

In one aspect, analysis of a solid (cement) behind a casing is conducted by a machine learning (ML) based workflow that automates the detection of clinging P arrivals in flexural wave data to suggest the presence of contaminated cement and to identify the top of cement. In one embodiment, feature extraction is performed on time frequency energy maps that are labelled, and a support vector machine algorithm is trained to detect candidates for clinging P arrivals. The possibility of confounding the clinging P detection with an actual specular reflection from a closely-located reflector beyond the casing outer interface (e.g., a third-interface echo or TIE) is accounted for by exploiting the appearance of a processing artifact called a galaxy pattern in the inverted impedance map from the pulse-echo resonance. See, U.S. Pat. No.: 5,859,811 by Miller et al. entitled "Method of analyzing waveforms", the contents of which is herein incorporated by reference in its entirety. To detect these TIE occurrences, a convolutional neural network is trained and applied to labelled acoustic impedance maps. The combination of the two supervised ML schemes yields an automated workflow that highlights axial and azimuthal regions where the annular fill behind casing is confirmed to be a solid with additionally a tight range for its compressional wave velocity—therefore rendering the diagnosis of the tool measurement more quantitative and more autonomous than delivered with existing inversion schemes.

In accordance with one embodiment, flexural wave data is utilized for detecting clinging P arrivals, while ultrasonic pulse echo data are utilized for finding TIEs through the identification of galaxy patterns on impedance maps. In one embodiment, an Isolation Scanner tool may be used to obtain the data. The Isolation Scanner tool is an ultrasonic cement evaluation tool, which combines an ultrasonic imager tool with a flexural wave imager (FWI). The USI uses a pulse-echo technique from which the acoustic impedance of the cement can be determined. The FWI has a pitch-catch configuration and induces a flexural Lamb mode in the casing with a transmitter and measures the reflected signals at two receivers. Combining the FWI signal attenuation calculated between the two receivers with the pulse-echo measurement and comparing it with a laboratory-based database enables the production of an interpretable image of the material in the annulus.

Figure 1:
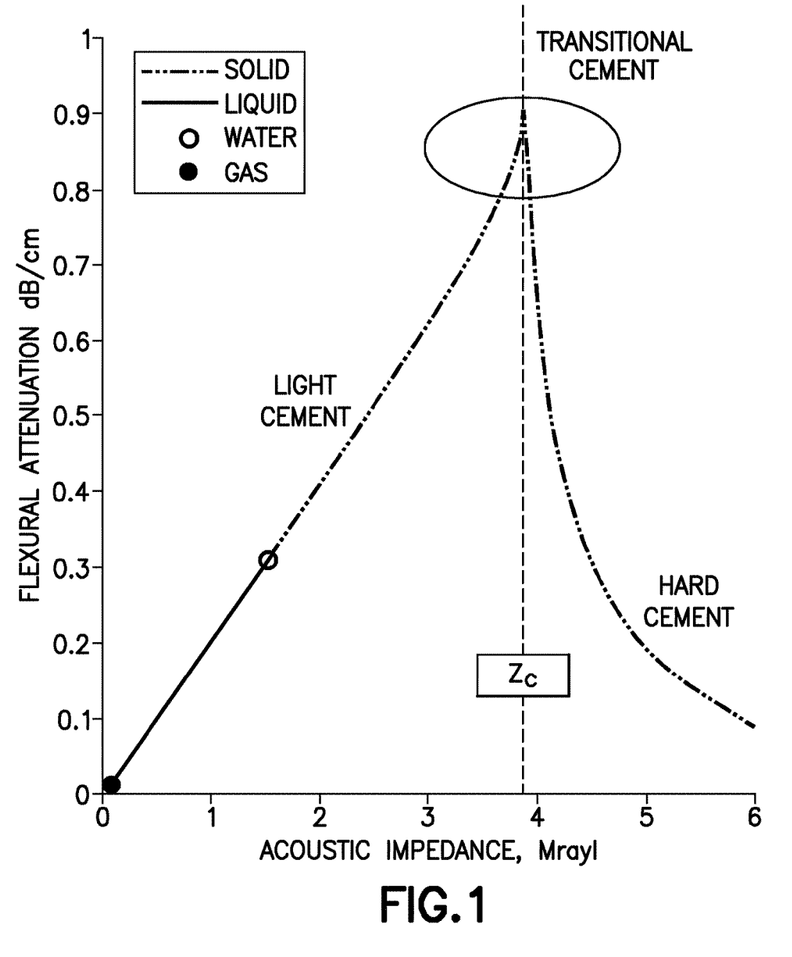
FIG. 1 depicts a plot of a flexural wavepacket attenuation of cements as a function of acoustic impedance.

FIG. 1 provides a plot of flexural attenuation versus acoustic impedance for a well-bonded cement. As seen in FIG. 1, below a critical impedance, $Z_c$, which corresponds to the critical wave speed of the cement, the flexural attenuation increases linearly with the acoustic impedance of the annulus, whereas above the critical impedance, the flexural attenuation drops rapidly. The flexural attenuation distinguishes liquid from light cement due to the change in the slope below $Z_c$, while the pulse echo technique (acoustic impedance) distinguishes liquid from hard cement. However, there is a region of transitional cement around $Z_c$ where it is unclear whether the cement is light or contaminated (hard cement contaminated with mud), and distinguishing between these conditions is not addressed in the prior art. In one aspect, identifying contaminated cement is extremely important, because the presence of contaminated cement usually happens at or near the top of cement in the annulus which can be challenging to locate accurately.

Figure 2:
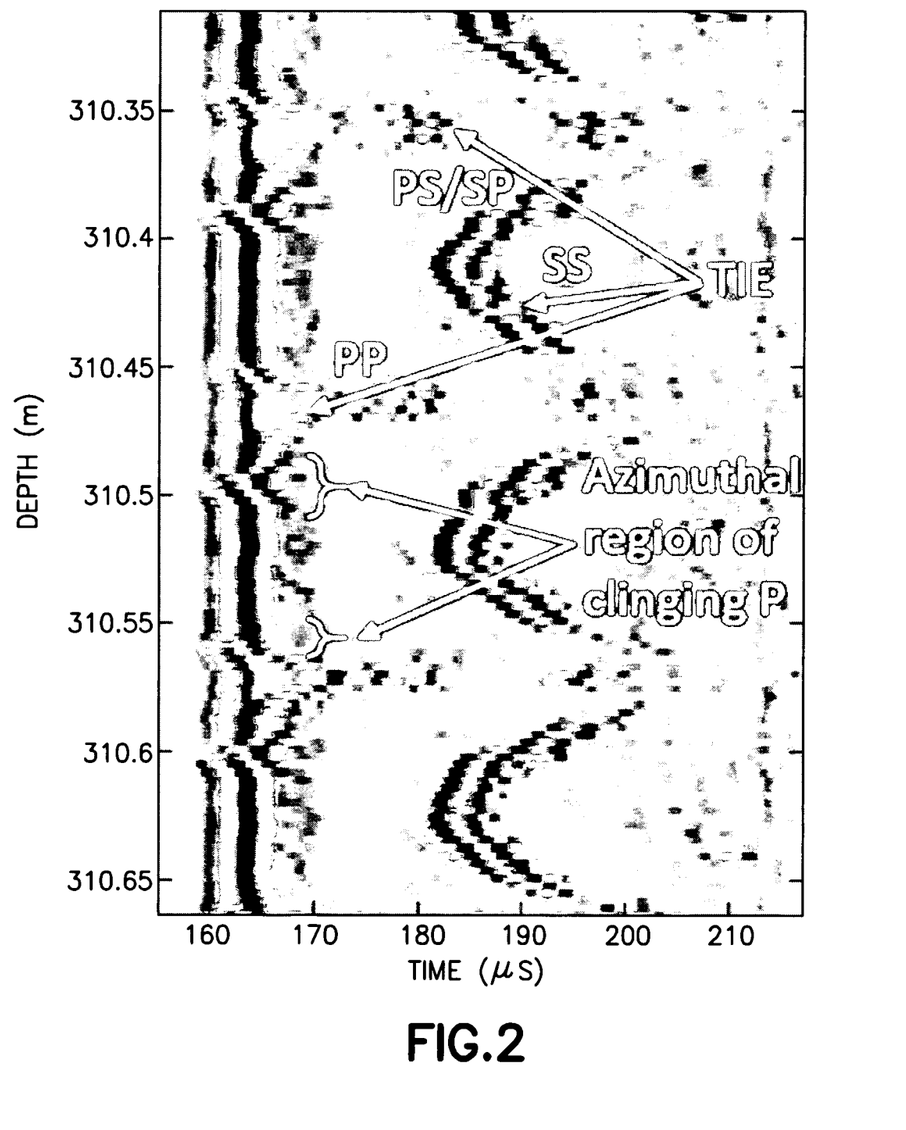
FIG. 2 depicts flexural waveforms with clinging P manifestation obtained over a plurality of azimuthal scans of a downhole tool.

In VDL (variable density display log) plots of the FWI waveforms, there are specific features called clinging P's, indicative of the presence of transitional cement with acoustic wave velocities in the range of 2400-3000 m/s. A clinging P is an additional echo interfering with the flexural wavepacket and is considered to be the P headwave that does not propagate in the annulus, but is confined along the casing-cement interface. FIG. 2 depicts flexural waveforms with clinging P manifestations over a plurality of azimuthal scans of the Isolation Scanner tool. The identification of the various echoes is based on an expert understanding of the measurement physics.

According to one aspect, the present disclosure relates to automating the identification of the occurrence of the clinging P feature without the intervention of an expert. Current deterministic workflows are not geared to detect and exploit the presence of a clinging P for interpretation because of its sporadic nature. The following disclosure presents a machine learning based workflow for the automatic detection of clinging P arrivals.

The presence of a clinging P in the FWI waveforms indicates that the attenuation dispersion (or attenuation as a function of frequency) is likely to exhibit a discontinuity that is associated with the intersection of the cement wave velocity with the casing flexural phase velocity dispersion curve. Manners for detecting this discontinuity and inferring the cement wave velocity are set forth in U.S. Pat. No. 9,534,487 to Zeroug et al. entitled "Cement Acoustic Properties from Ultrasonic Signal Amplitude Dispersions in Cased Wells", and U.S. Pat. No. 9,784,875 to Zeroug et al. entitled "Method to Estimate Cement Acoustic Wave Speeds from Data Acquired by A Cased Hole Ultrasonic Cement Evaluation Tool", the contents of both of which are herein incorporated by reference in their entireties. Detecting the presence of a clinging P provides the depth and azimuthal interval where this discontinuity is present and thus indicates where such a processing scheme should be applied to estimate the cement wave velocity.

As seen in FIG. 2, a third-interface echo (TIE) can also follow the casing flexural arrival. When the casing cemented in a borehole is eccentered, the TIE (a reflection from the cement-rock interface in the pulse-echo signal) can arrive right after the casing event: a condition that can be confused with the presence of a clinging P event. In one embodiment, the workflow set forth hereinafter considers the disambiguation of a clinging P from a TIE by relying on an independent manifestation of TIEs called galaxy patterns in the estimated pulse-echo impedance image. The latter attribute is related to the use of an electrical circuit equivalent for the inversion of the cement acoustic impedance from the pulse-echo signal under the assumption of infinitely-thick cement sheath. When the cement thickness is minimal as occurs when the casing is highly eccentered, the presence of the TIE perturbs the estimation of the acoustic impedance over the azimuthal range of minimal cement thickness in ways that lead to the development of features known as galaxy patterns in the inverted cement impedance. See previously incorporated U.S. Pat. No. 5,859,811 to Miller et al.

Figure 3A:
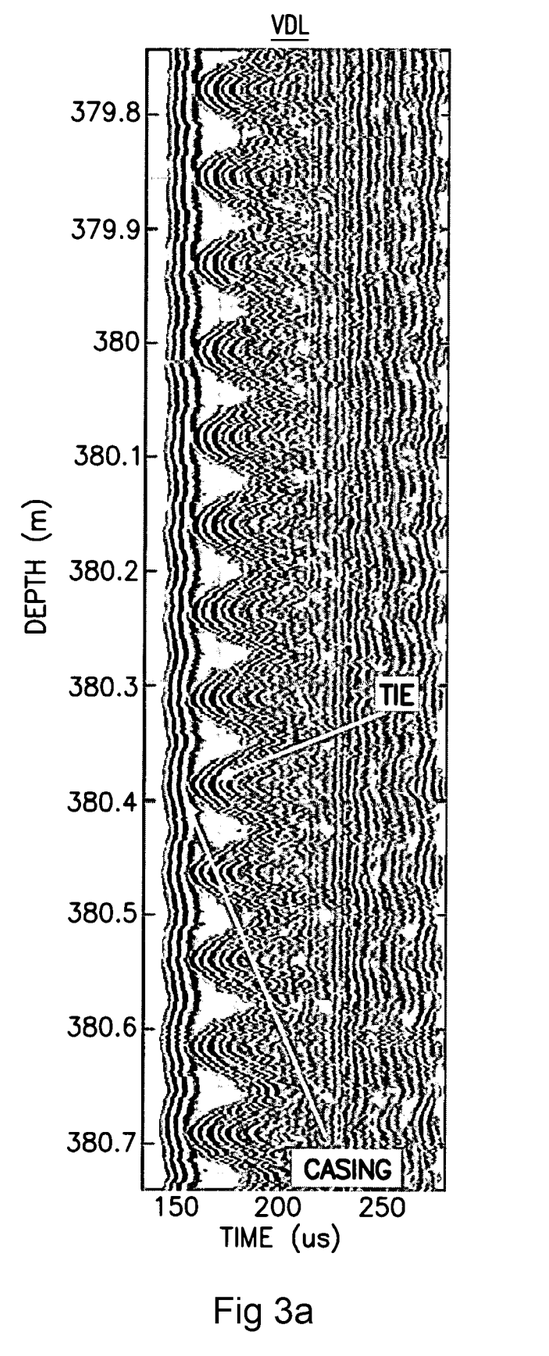
FIGS. 3A and 3B respectively depict a log showing a third-interface echo (TIE), and an impedance map as a function of azimuth manifesting a galaxy pattern which results from a TIE.
Figure 3B:
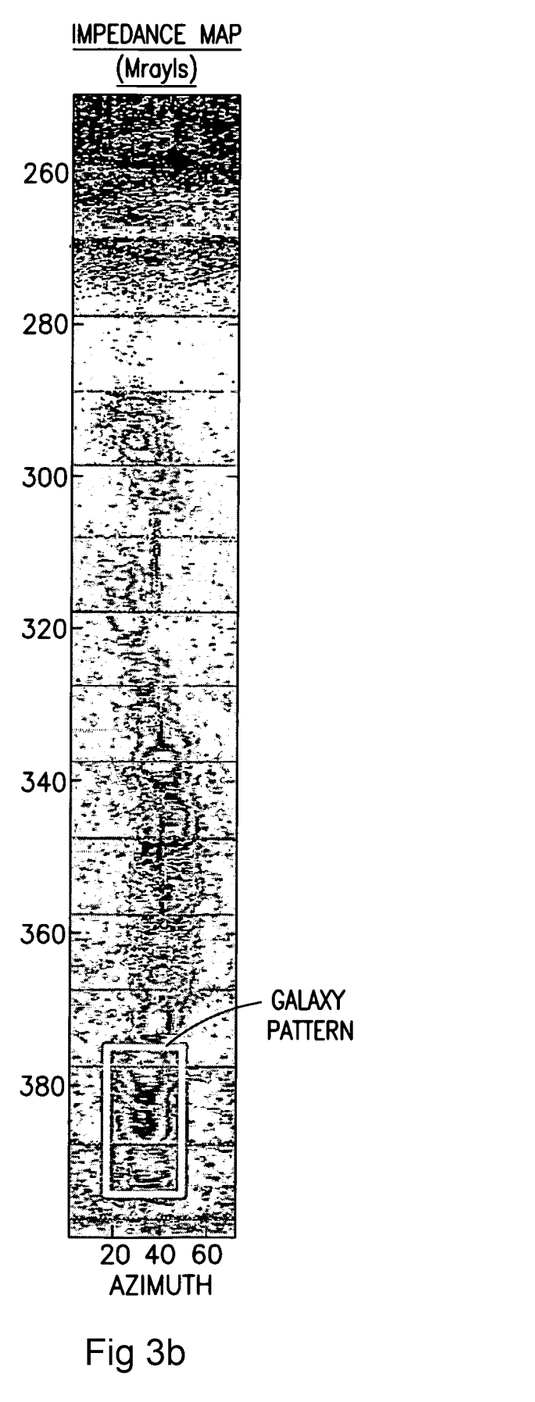

A galaxy pattern in an impedance map (generated using pulse-echo data) is seen in FIG. 3B. The VDL log of FIG. 3A shows that for the highlighted area of FIG. 3B with the galaxy pattern, a TIE arrives right after the casing event.

According to one aspect, the clinging P phenomenon may be explained as follows. The transfer of energy from the borehole fluid to the cement sheath is carried out via the flexural wave propagating axially in the casing. At every frequency, Snell's law requires that the horizontal slowness to be the same in the borehole fluid, the steel casing and the cement. Accordingly:

$$\frac{\sin(\theta(\omega))}{\upsilon_{fluid}} = \frac{1}{\upsilon_{flex}(\omega)} = \frac{\sin(\theta_{P,S}(\omega))}{\upsilon_{P,S}} \quad (1)$$

where $\upsilon_{P,S}$ refers to either P or S wave speed in the cement with corresponding angles $\theta_{P,S}$. Considering Snell's law, it becomes clear that for a wave to propagate inside the cement sheath as a bulk wave, its angle $\theta_{P,S}$ has to be real. This imposes the condition:

$$\upsilon_{P,S} < \upsilon_{flex} \quad (2)$$

Figure 4:
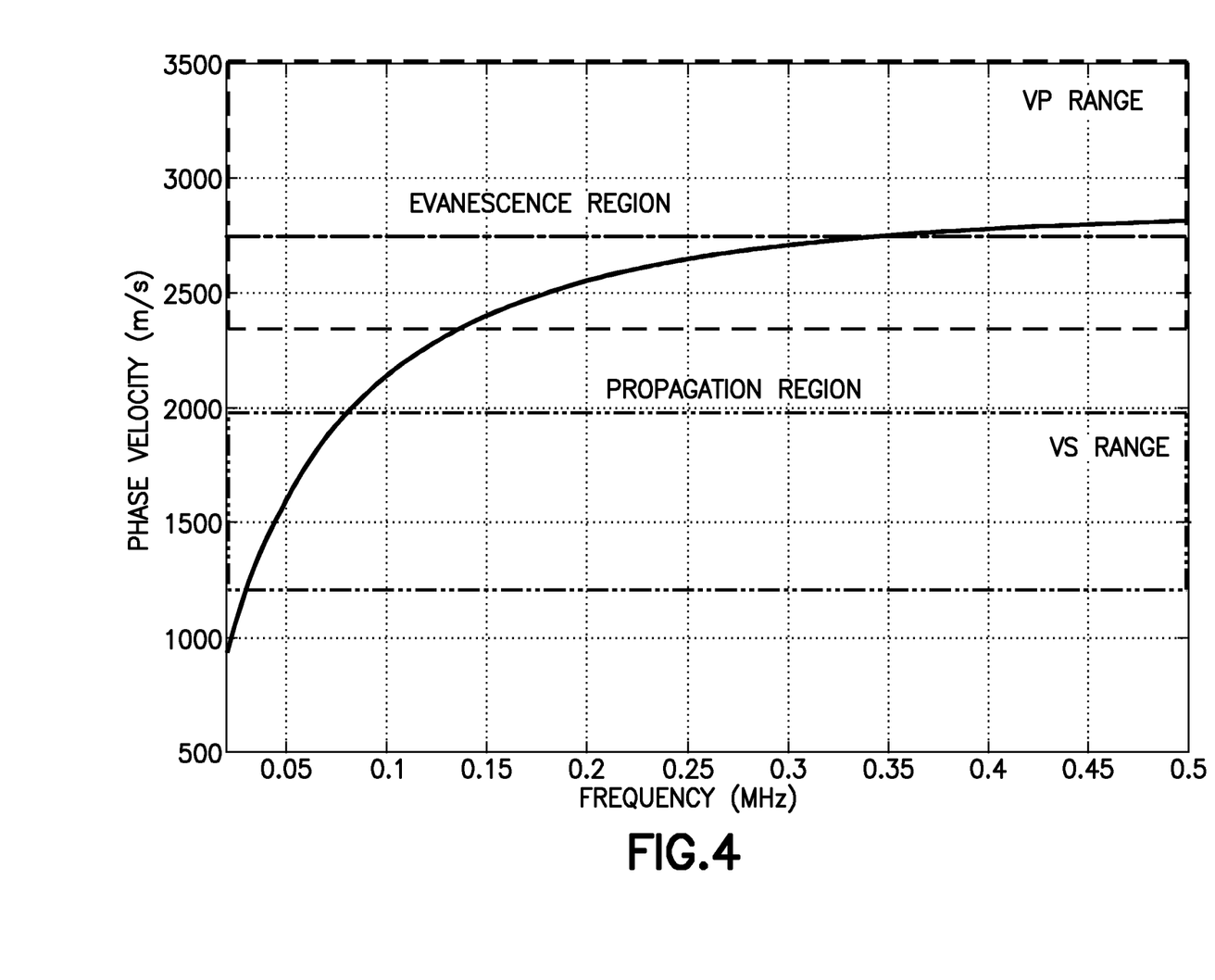
FIG. 4 depicts a graph of flexural wave velocity versus frequency dispersion.

FIG. 4 shows the dispersion of the flexural Lamb mode with the horizontal line at a phase velocity of approximately 2750 m/s representing a wave velocity in the cement often associated with the compressional bulk wave ($\upsilon_P$). The intersection of this horizontal line with the dispersion curve yields the transition frequency above which there is propagation (because the flexural wave velocity is larger than the wave velocity in the cement) and below which there is evanescence. This interpretation applies to a plane wave, while for a pulsed beam, which can be taken to be made of a spectrum of plane waves propagating in a small angular interval, the transition in the frequency domain is not abrupt. Clinging P happens for the frequencies for which $\upsilon_{P,S} < \upsilon_{flex}$ and accordingly is found in the evanescence regime where acoustic energy does not propagate in the cement sheath but remains confined to the casing-cement interface.

According to one aspect, the galaxy pattern phenomenon may be explained as follows. Galaxy patterns appear as fringes on an inverted impedance map obtained from pulse echo data, which is based on the excitation of a thickness resonance of the casing. See Sinha et al., "Geophysical prospecting using sonics and ultrasonics", Wiley Encyclopedia of Electrical and Electronics Engineering, Ed. J. G. Webster, 340-365, (1999). Due to the eccentering of the casing relative to the annulus, the annulus thickness varies as a function of azimuth and the TIE's interfere with the thickness resonance destructively or constructively for different azimuths depending on the ultrasonic travel time through the cement, resulting in a distortion of the cement impedance from its value obtained for an infinitely-thick annulus. Thus, galaxy patterns can be considered as a processing artifact. Destructive interference results in a high impedance, while constructive interference in a low one.

Turning back to clinging Ps, according to one aspect, in order to develop a machine learning based framework to identify a clinging P, a determination needs to be made as to which features characterize its presence. A clinging P appears in VDL waveforms as a low frequency echo, which interferes with the casing arrival. In one embodiment, this is the feature that is used to label each sample of a training set as having a clinging P or not. In embodiments, an extra dimension (i.e. frequency) may be added to the VDL to investigate this feature in frequency and time domain simultaneously.

Figure 5:
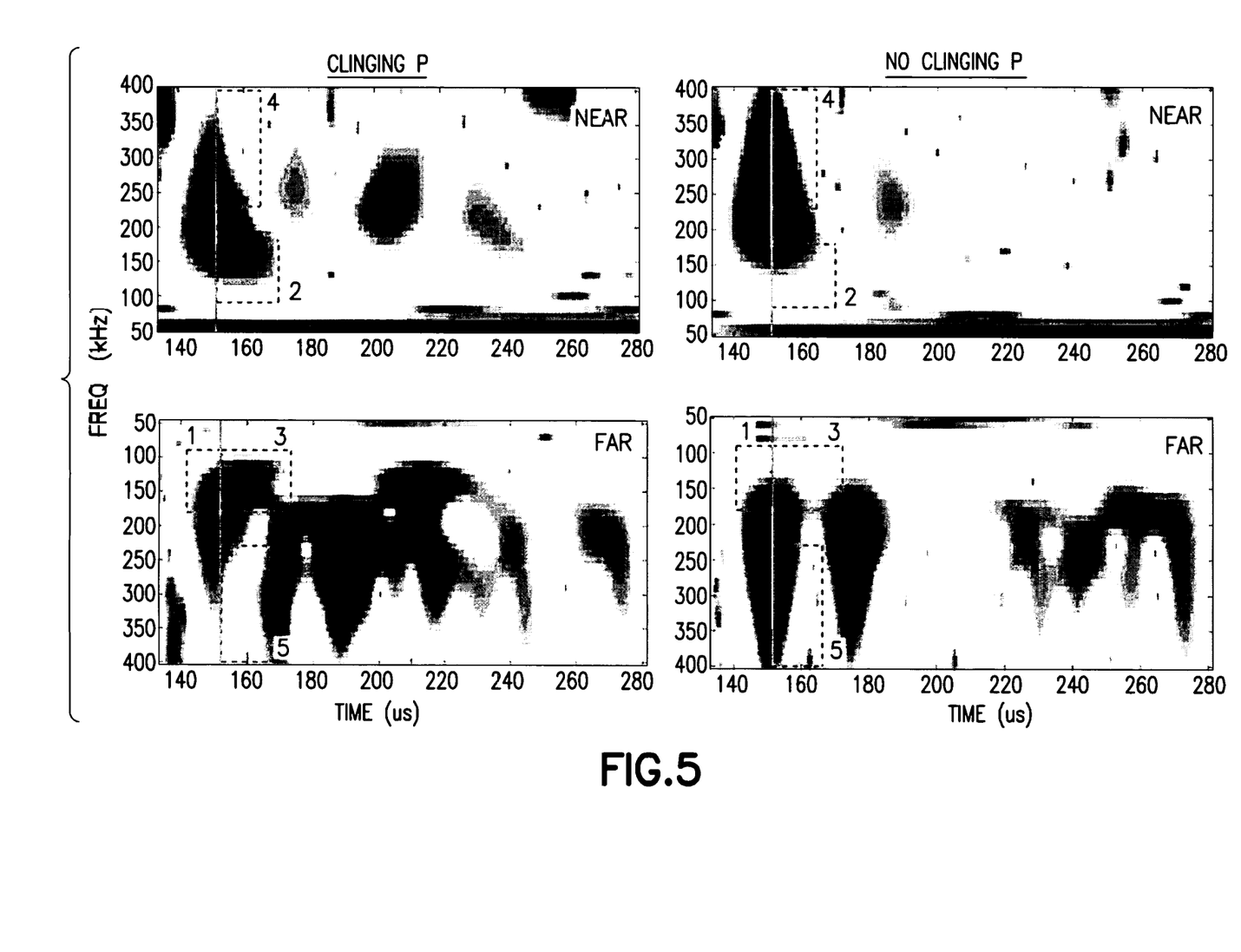
FIG. 5 depicts a time-frequency plot for near and far receivers of a flexural wave imager (FWI) measurement in the presence of clinging P (left panels) and absence of clinging P (right panels)

Using a continuous wavelet transform (CWT) on the VDL waveforms, a time-frequency plot is obtained for a specific depth and azimuth. In FIG. 5 time-frequency plots are shown for a near receiver (top panels) and a far receiver (bottom panels) for the case of clinging P (left panels) and no clinging P (right panels). The vertical line (at a time of about 151.5 microseconds) in each subplot identifies the peak of the casing energy, which corresponds to the first strong arrival. For distinguishing a clinging P scenario from the scenario having an absence of a clinging P, five windows are identified relative to the casing. Windows 1 and 3 (in the far receiver plots) and 2 (in the near receiver plots) are for low frequencies, and the energy content of windows 2 and 3 behind the casing arrival will determine the presence or not of a clinging P. Comparing the energy content of windows 2 and 3 for the cases of clinging P and no clinging P, it can be seen clearly that there exists the presence of energy next to the casing for the low frequencies when clinging P is present. This energy content for low frequencies is absent when there is no clinging P. Window 1 works as a baseline for window 3 and combining its information with window 3 shows a symmetry in the energy content around the casing for the absence of clinging P. At the presence of clinging P, window 1 together with window 3 show that the casing is perturbed due to the extra echo. Windows 4 (near receiver) and 5 (far receiver) are for high frequencies and correspond to the TIE's. The dimension of the windows along the time axis are based on the delay of clinging P relative to the casing and are adjusted to include the energy content that discriminates between the presence or absence of clinging P.

The time-frequency plots are normalized relative to the maximum energy for each depth and azimuth and the energy content of all five windows is extracted into a feature vector, which is labeled as clinging P or not. In one embodiment, a support vector machine (SVM) algorithm with a linear kernel is used to train the feature vectors, which have been labeled as clinging P or not. SVM is particularly useful since it is known where to expect a clinging P in the time and frequency domains and thus features that characterize it can be extracted.

Figure 6:
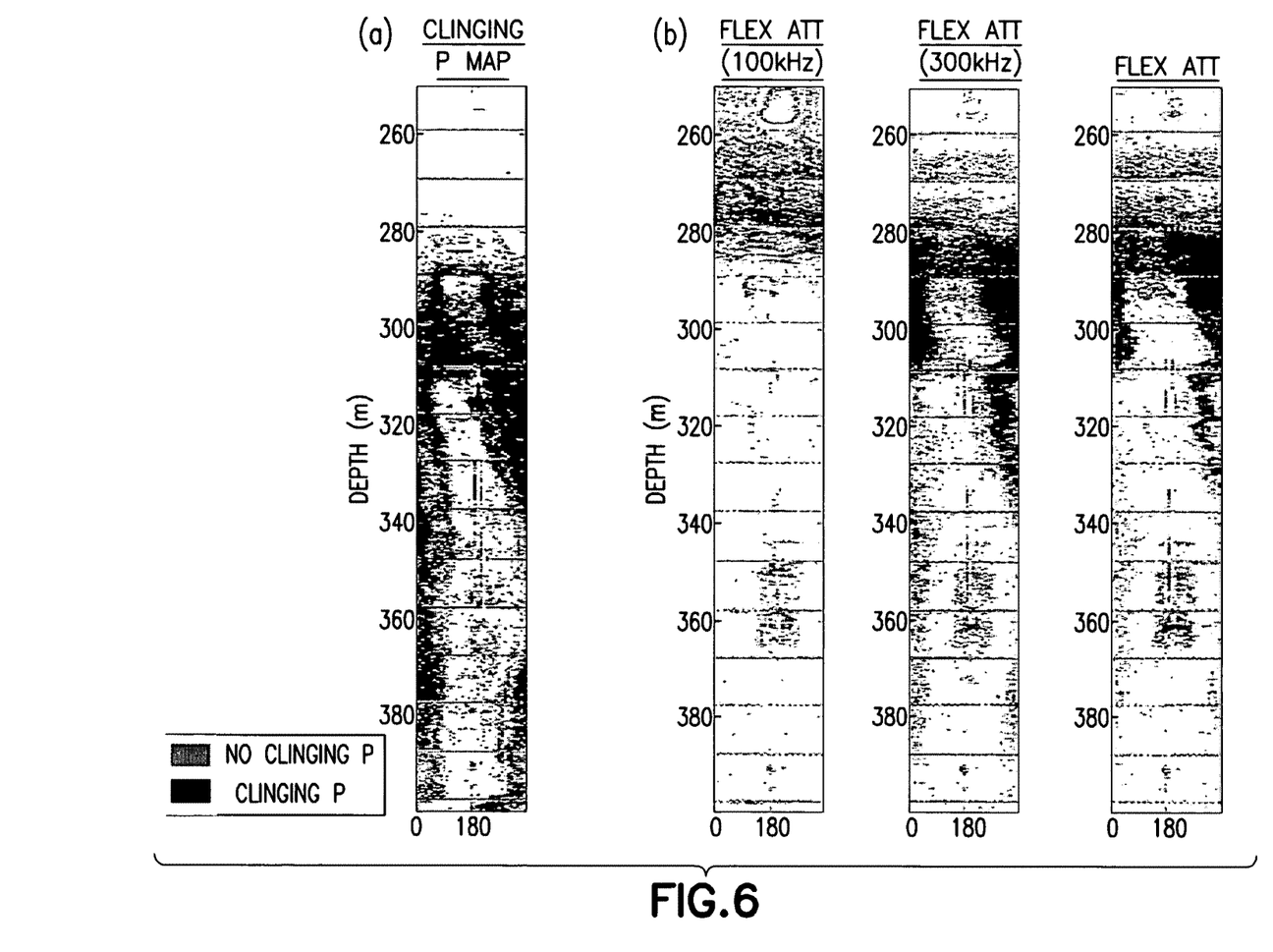
FIG. 6 depicts machine learning based detection of clinging P from FWI waveforms as a function of depth and azimuth.

The SVM algorithm was applied on field data and results are shown in FIG. 6 where the left-most panel shows the machine learning based detection of clinging P from FWI waveforms as a function of depth (y axis) and azimuth (x axis). The next two panels (i.e., the flexural attenuation for 100 and 300 kHz) show that for the depths and azimuths (indicated with a star) at which the algorithm predicts a clinging P, there is a transition from low attenuation at 100 kHz (i.e., evanescence) to high attenuation at 300 kHz (i.e., propagation) as expected. This transition from low attention at 100 kHz to high attenuation at 300 kHz, which is indicative of a clinging P is seen particularly at a depth of approximately 315 meters in the central two panels of FIG. 6. The right-most plot shows flexural attenuation which is a weighted average of the frequency content and does not give a good indication of the transition from evanescence to propagation as a function of frequency.

Figure 7:
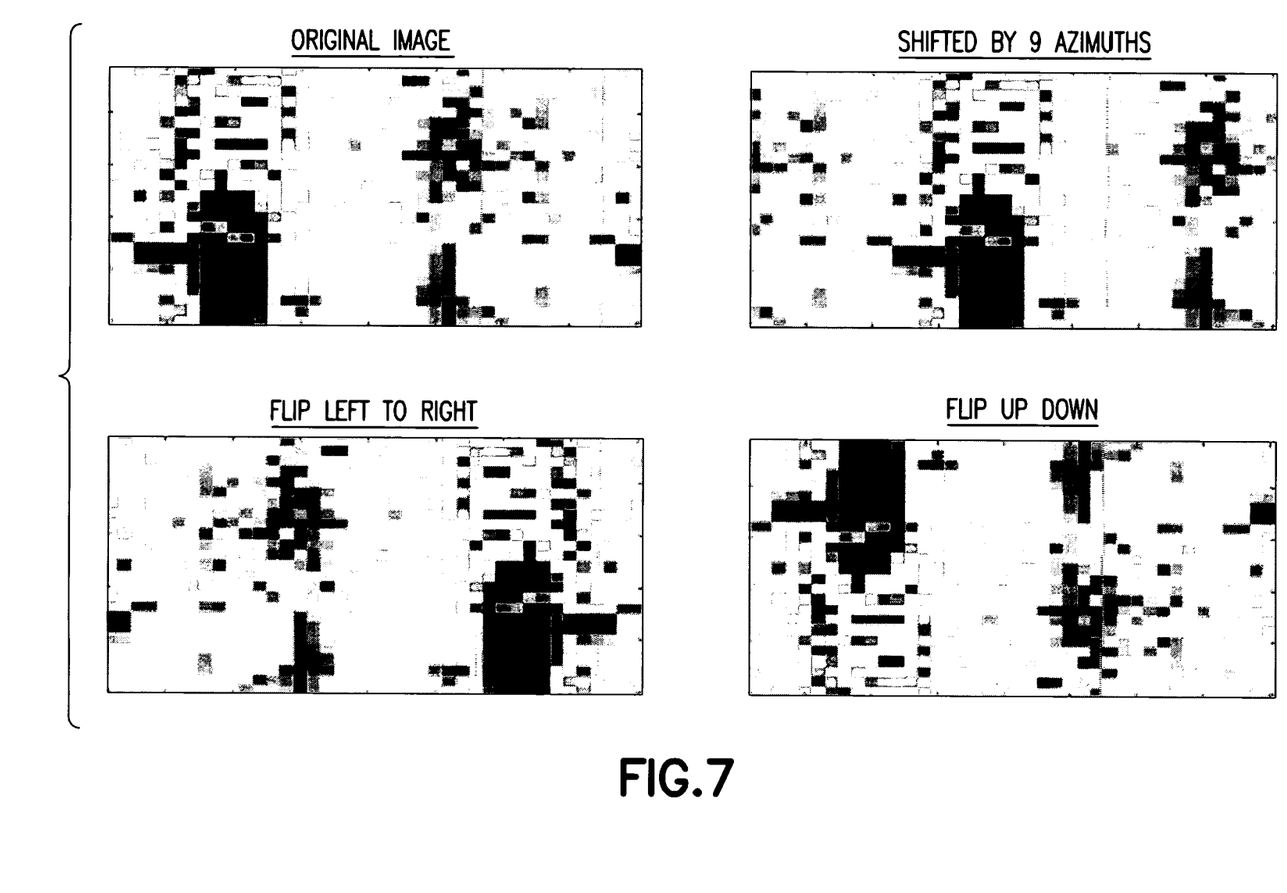
FIG. 7 depicts a training set for a convolutional neural network (CNN) which is augmented with azimuthal shifts and flips of each image from left to right and up down.

Turning back to the galaxy patterns, according to one aspect, galaxy patterns may be automatically identified using a CNN which extracts the features automatically. Accordingly, it is not necessary to create a feature that looks like a fringe. In addition, the location of the galaxy pattern, unlike a clinging P, is not specific, and a CNN is well adapted to locate it. In one embodiment, after normalizing the galaxy pattern, a training set comprises a plurality of images with dimensions, e.g., 25 pixels in depth and 40 pixels azimuthally, labeled as galaxy pattern or not. Padding may be completed azimuthally (e.g., 2 pixels at each edge) to avoid the edge effect and the training set may be augmented with azimuthal shifts and flips of each image from left to right and upside down. FIG. 7 shows examples of images used in the training set, with the original image at the top left, the original image shifted by nine azimuths on the top right, the original image flipped left to right on the bottom left, and the original image flipped upside down on the bottom right.

Figure 8:
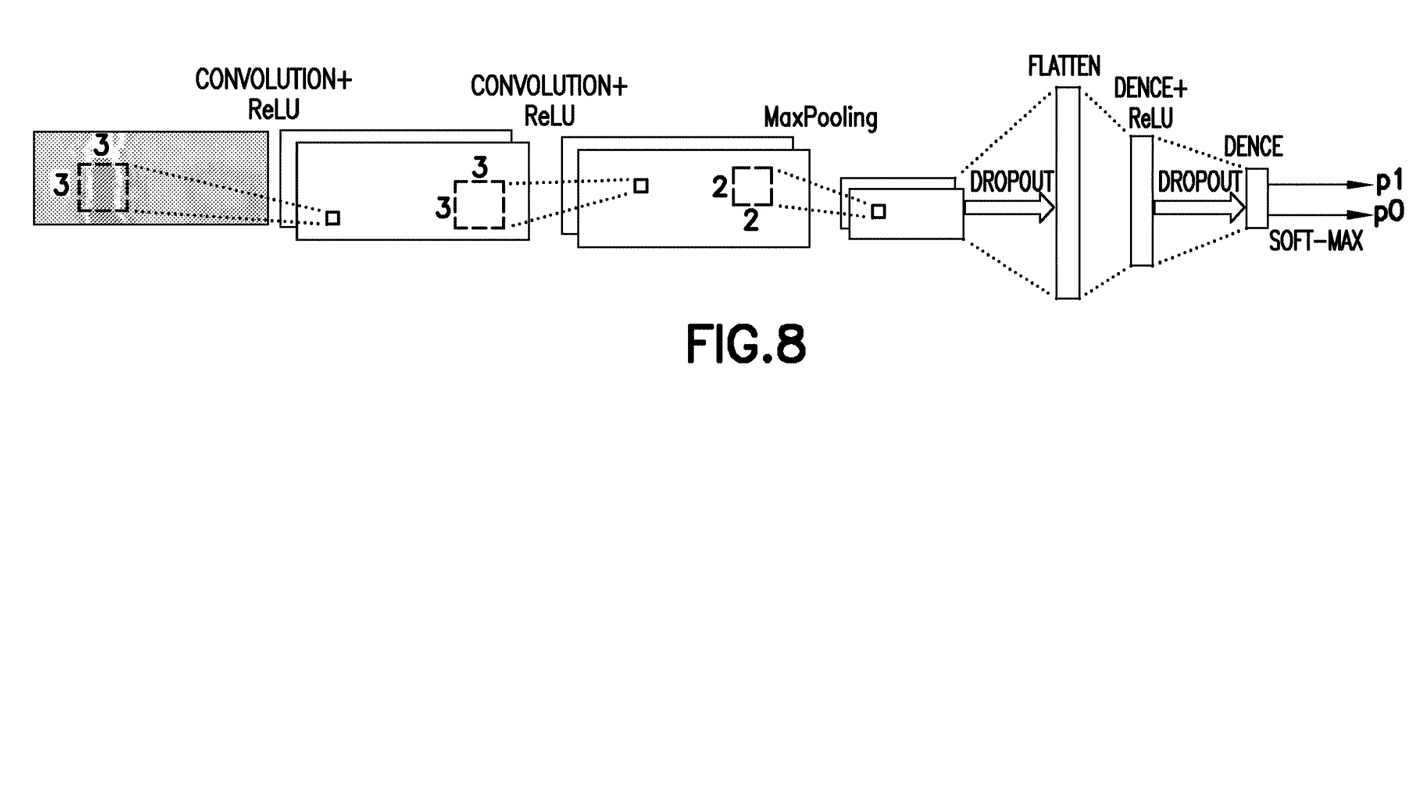
FIG. 8 shows a CNN used to identify galaxy patterns and including two convolutional layers, with each layer having two learnable filters with a receptive field of 3 by 3 in order to capture a fringe.

One embodiment of a CNN for detecting galaxy patterns is shown in FIG. 8. The CNN takes as input, images which are frames of impedance maps and gives as output the probability that the image has a galaxy pattern (p1) or not (p0). The shown CNN includes two convolutional layers, with each one having two learnable filters with respective field of 3 by 3 pixels. The filter size was chosen to identify one fringe, which is around 25 degrees azimuthally. Each convolutional layer is followed by a rectified linear unit (ReLU), which brings the nonlinear properties to the network. According to one aspect, the convolutional layers followed by ReLU were used at the front end, because multiple stacked convolutional layers can develop more complex features of the input image before the destructive pooling operation. As seen in FIG. 8, after the second convolutional layer and ReLU, the next layer is a maxpooling layer which serves as a downsampling layer, followed by a dropout layer which drops a random set of activations (e.g., 50%). The representation is flattened (flatten layer) and becomes a vector followed by a fully connected (dense) layer with ReLU activation and a dropout layer. Finally, a fully connected layer (dense layer with softmax activation) is provided with two values, one for each class. These values are in the real numbers space and the softmax function maps them to the probability space giving the probabilities that the input image has a galaxy pattern or not.

Figure 9:
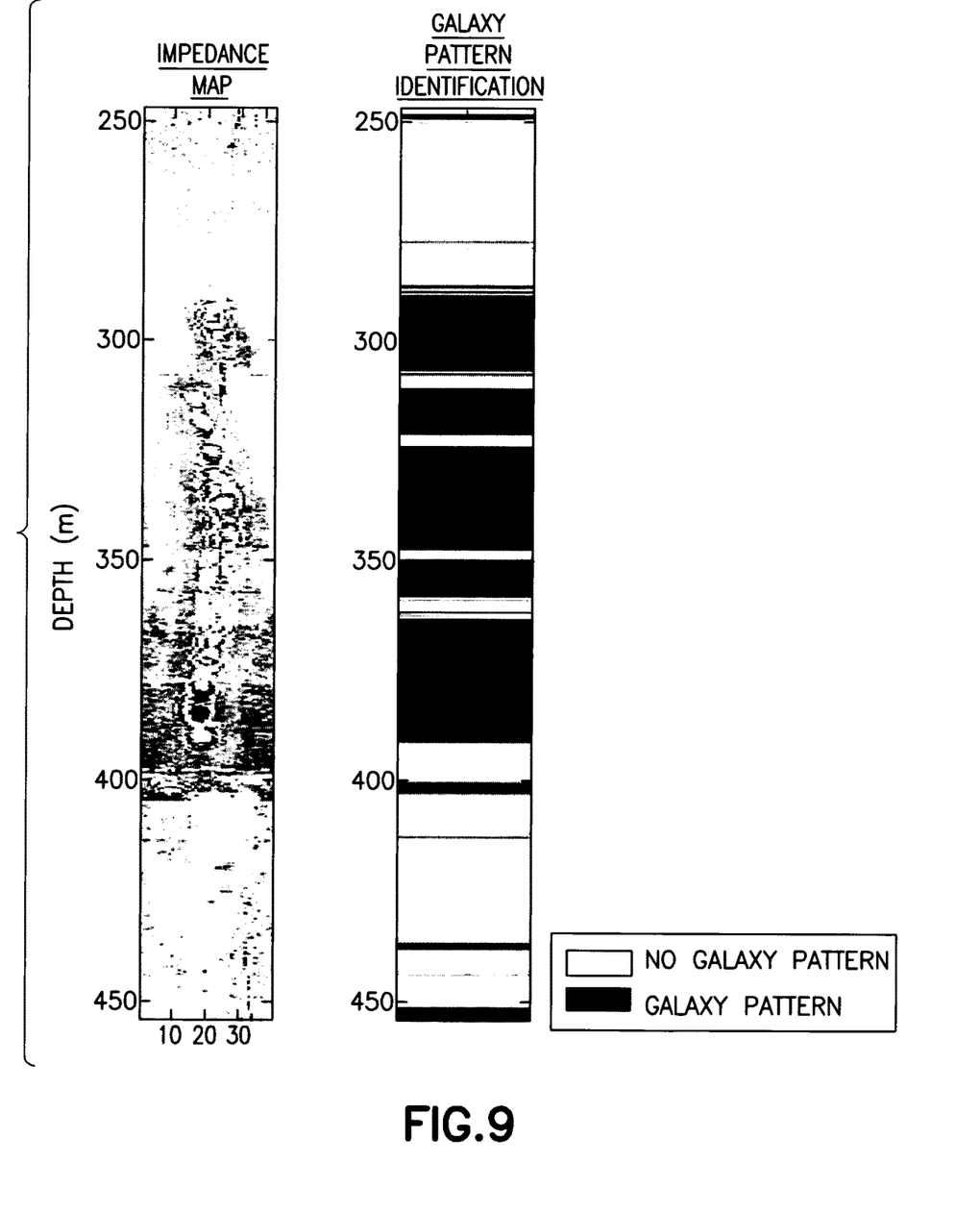
FIG. 9 depicts application of the trained CNN to field data for galaxy pattern identification.

Turning to FIG. 9, an impedance map generated from pulse-echo data is shown in the left panel, and the results of a galaxy pattern identification conducted by a trained CNN is shown in the right panel. The panels of FIG. 9 show that the CNN detects the galaxy pattern as a function of depth correctly.

Figure 10:
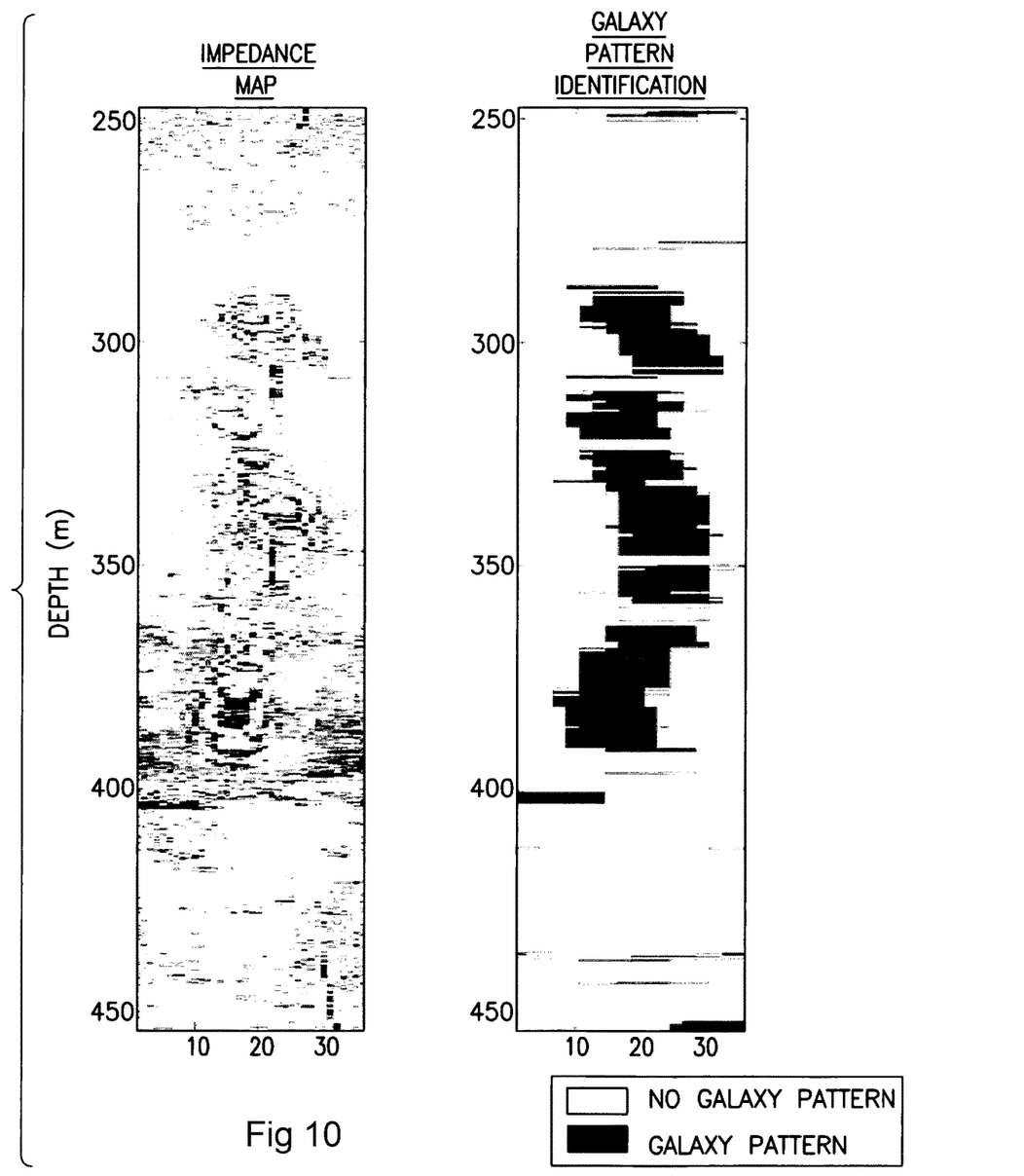
FIG. 10 depicts an impedance map (left panel) and a resulting galaxy pattern identification (right panel) obtained by applying a sliding window in the test set.

According to one aspect, galaxy patterns occur for specific azimuths. According to one embodiment, it may be desirable to localize the galaxy patterns by azimuth. Without having to retrain again, a sliding window may be used in the test set, with the sliding window covering 13 azimuths, and each pixel outside taking the average value of the whole image. The window that is chosen to include the galaxy pattern is the one with the highest difference between the scores that the two classes (presence of galaxy pattern or absence of it) take. This difference is the input to the soft-max layer of FIG. 8, which maps from real numbers space to probability space. The result of the galaxy pattern localization is shown in FIG. 10 demonstrating that the CNN predicts its location correctly.

Figure 11A:
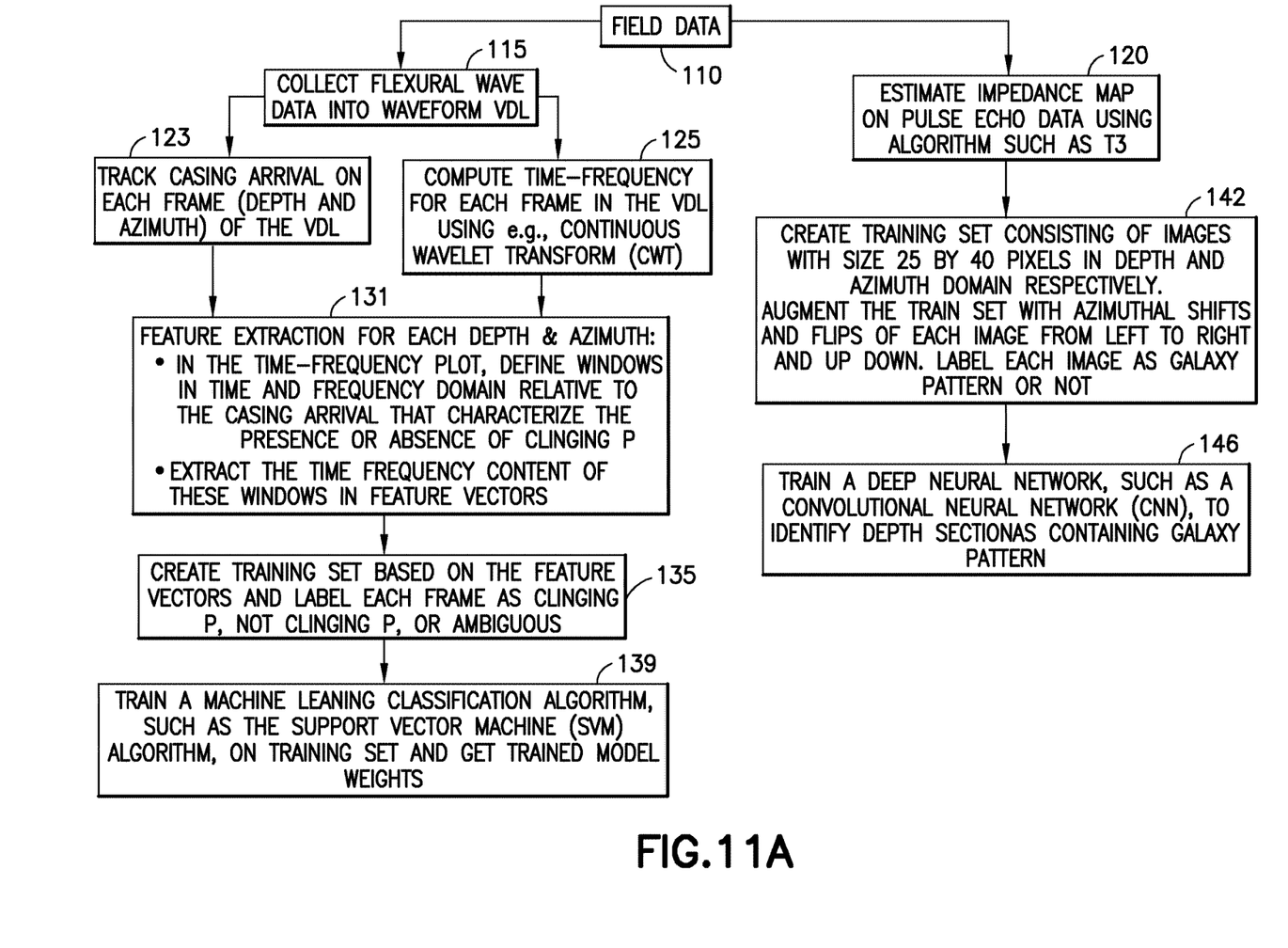
FIG. 11A depicts a machine learning based workflow for the automatic detection of clinging P arrivals and for the presence of TIEs in eccentered casing configurations.

Turning to FIG. 11A, and based on the above, a machine learning based workflow for the automatic detection of clinging P arrivals and for the presence of TIEs in eccentered casing configurations may be described as follows. At 110, field data obtained by, e.g., an Isolation Scanner tool is gathered. The field data may be data obtained from selected cased boreholes, or more widely from many cased boreholes. At 115, flexural wave data is collected into a VDL whereas at 120, the pulse echo data is processed to obtain an impedance map using an algorithm such as T3 (which is an inversion used to derive the cement impedance from the pulse-echo measurement data. See Hayman, A.J. et al. "High-Resolution Cementation and Corrosion Imaging by Ultrasound", Society of Petrophysicists and Well-Log Analysts (Jan. 1, 1991). With respect to the flexural data, from the VDL, at 123, the casing arrival on each frame (depth and azimuth of the VDL) is tracked, and at 125, the time-frequency for each frame in the VDL is computed using, e.g., a continuous wavelet transform. Then, at 131, feature extraction is conducted for each depth and azimuth. In particular, in a time-frequency plot, windows are defined in the time and frequency domain relative to the casing arrival (as discussed above with reference to FIG. 5) that characterize the presence or absence of a clinging P. The time frequency content of these windows is extracted in feature vectors. At 135, a training set based on the feature vectors is created, and each frame is labeled as having a clinging P, as not having a clinging P, or as ambiguous. At 139, a machine leaning classification algorithm such as a support vector machine (SVM) is trained on the training set to obtain trained model weights. Turning to the pulse-echo data side, from the impedance map, at 142, a training comprising images (e.g., size 25 in depth by 40 pixels in azimuth) is created and can be augmented with azimuthal shifts and flips (as discussed above with reference to FIG. 7). At 146, a deep neural network such as a CNN is trained to identify depth sections containing galaxy patterns (as discussed above with reference to FIGS. 8 and 9). As discussed below with reference to FIG. 11b, the galaxy patterns indicate the presence of TIEs close to the casing and may be used to disqualify a preliminary determination by the SVM that a clinging P is present.

Figure 11B:
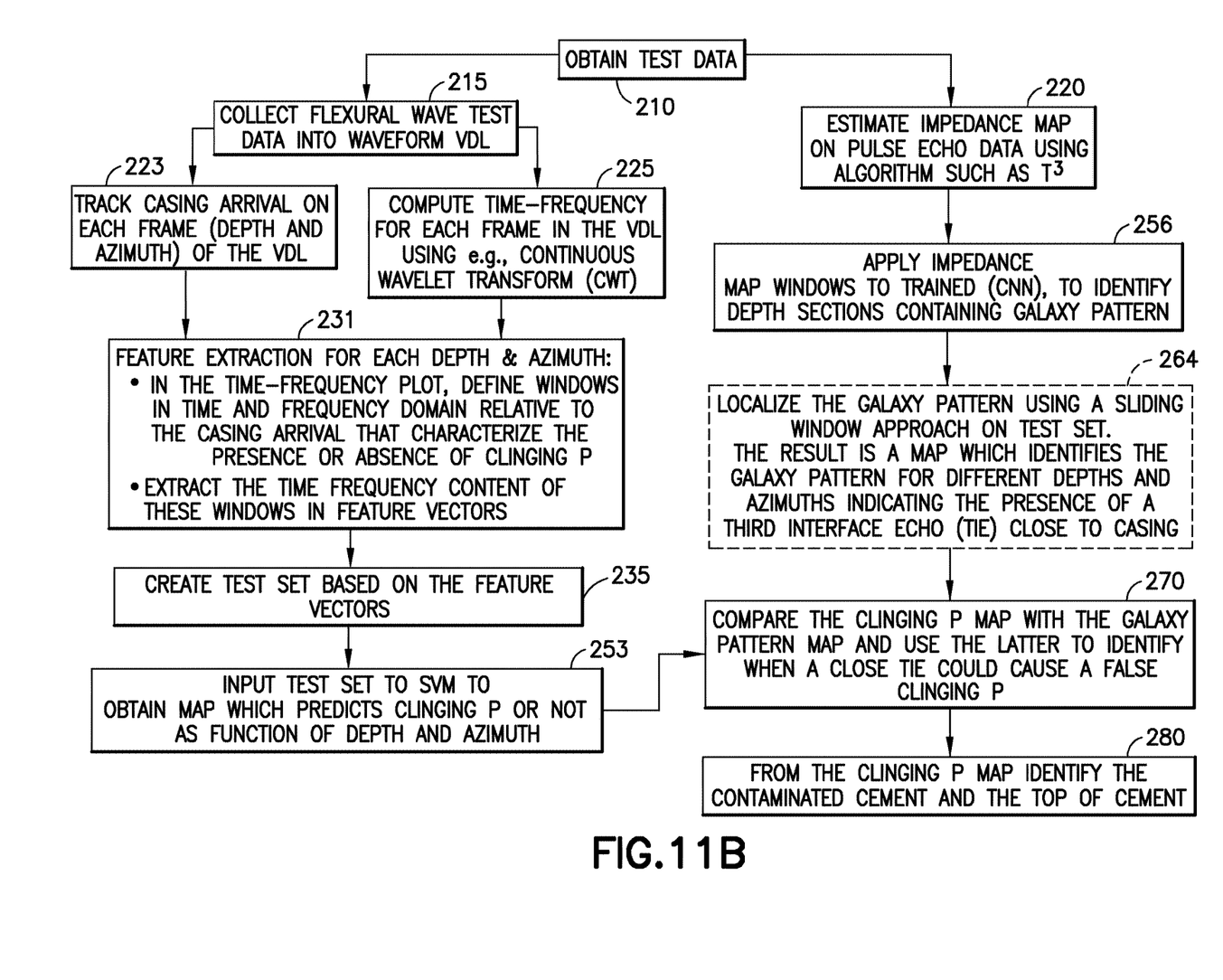
FIG. 11B depicts a method for identifying contaminated cement from ultrasonic data obtained from a downhole tool and using trained machine learning elements that identify clinging P arrivals and the presence of TIEs.

Turning now to FIG. 11B, once an SVM is trained for locating clinging Ps and a CNN is trained for locating galaxy patterns indicative of TIEs, a data set may be analyzed to find the presence of a clinging P as follows. At 210, flexural wave data and pulse echo data for a wellbore of interest (the "test set") are obtained by, e.g., an Isolation Scanner tool or other tools. At 215, the flexural wave data is collected into a VDL for the wellbore of interest, and at 220 the pulse echo data is processed to obtain an impedance map of the wellbore of interest. At 223, the casing arrival is tracked on each frame (depth and azimuth) of the VDL and at 225, the time frequency for each frame in the VDL is computed using, e.g., a continuous wavelet transform. At 231, the system conducts feature extraction for each depth and azimuth. In the time-frequency plot, windows are defined in time and frequency domain relative to the casing arrival that characterizes the presence or absence of a clinging P, and the time frequency content of these window are extracted in feature vectors. Then, at 235, a test set is created based on the feature vectors. At 253, the test set is input into the trained SVM (i.e., the trained SVM is applied to the test set) to obtain a map which predicts the presence (or not) of a clinging P as a function of depth and azimuth. Turning to the pulse echo data side of FIG. 11B, at 256, the test data impedance map is provided as input to a previously trained CNN (i.e., the trained CNN is applied on the impedance map) to identify one or more depth sections containing a galaxy pattern, if present. The galaxy pattern identifies the presence of a TIE close to the casing for a particular casing depth. If desired, in applying the impedance map to the trained CNN, a sliding window approach may be used on the pulse-echo data test set to identify not only the depths, but the azimuths of the TIEs, as previously discussed with reference to FIG. 10. At 270, the clinging P map is compared to the galaxy pattern map to disambiguate a clinging P identified by the SVM from a TIE. At 280, where a clinging P is identified but no TIE (galaxy pattern) is present, (i.e., the clinging P has been disambiguated), a determination is made that contaminated cement is present, and a top of cement depth determination may be made.

Some of the methods and processes described above, can be performed by a processor. By way of example, the generation of a VDL and the generation of impedance maps will be performed by processors. Similarly, the SVM and CNN may be implemented by apparatus or machines such as processors. Furthermore, the comparison of the clinging P map with the galaxy pattern map in order to identify the top of cement location may be conducted by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Thus, by way of example, while specific downhole tools (such as the Isolation Scanner) were described for obtaining flexural wave and pulse echo data, other tools could be utilized. Also, while particular techniques were described for generating flexural wave imager waveforms and impedance maps or images, other techniques could be utilized. Further, while particular machine learning algorithms such as an SVM and CNN were described, other machine learning algorithms could be utilized and applied to the different maps/images. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for evaluating cement surrounding a casing in a wellbore, comprising:
   obtaining flexural wave training data from various wellbores having cement surrounding casings;
   collecting the flexural wave training data to obtain training density displays;
   training a first machine learning processor to identify clinging Ps based on the training density displays;
   using at least one wellbore tool in the wellbore to obtain flexural wave test data;
   processing the flexural wave test data to obtain a density display for the wellbore;
   applying the density display for the wellbore to the first machine learning processor to locate a potential clinging P for the wellbore;
   identifying at least one of potential contaminated cement location and top of cement location for the cement of the wellbore based on the location of the potential clinging P.

2. The method of claim 1, wherein the first machine learning processor implements a support vector machine (SVM) algorithm.

3. The method of claim 2, wherein the processing of flexural wave training data further comprises:
   tracking casing arrivals on each frame of the training density displays;
   computing time-frequency for each frame of the training density displays;
   defining windows in time and frequency domains relative to the casing arrival that characterizes the presence or absence of clinging Ps, and
   extracting time frequency content of these windows in feature vectors.

4. The method of claim 3, further comprising:
   labeling each frame with labels of a clinging P or not a clinging P, wherein said training a first machine learning processor further comprises using the feature vectors and said labels to create a clinging P training set to obtain trained model weights.

5. The method of claim 1, further comprising:
   obtaining ultrasonic wave training data from various wellbores having cement surrounding casings;
   processing the ultrasonic wave training data to obtain training impedance maps;
   training a second machine learning processor to identify third-interface echoes (TIEs) based on patterns based on the training impedance maps;
   using the at least one wellbore tool in the wellbore to obtain ultrasonic test data;
   processing the ultrasonic test data to obtain a test impedance map for the wellbore; and
   applying windows of the test impedance map for the wellbore to the second machine learning processor to locate TIEs for the wellbore at identified locations.

6. The method of claim 5, further comprising:
   comparing locations of potential clinging Ps with the identified locations of TIEs in the wellbore in order to disambiguate a clinging P from a TIE.

7. The method of claim 6, wherein one of a potential contaminated cement location and top of cement location for the cement of the wellbore is identified as one of an actual contaminated cement location and top of cement location where a clinging P is found without a TIE.

8. The method of claim 6, wherein the second machine learning processor implements a convolutional neural network (CNN).

9. The method of claim 8, wherein said ultrasonic wave training data is ultrasonic pulse echo training data and said ultrasonic test data is ultrasonic pulse echo test data.

10. The method of claim 9, wherein the training a second machine learning processor comprises creating a training set having images selected from portions of the training impedance maps and training the CNN to identify depth sections containing galaxy patterns.

11. The method of claim 10, wherein said creating a training set having images comprises augmenting the training set with azimuthal shifts of the images.

12. The method of claim 10, wherein said creating a training set having images comprises augmenting the training set with right-to-left and upside-down flips of the images.

13. The method of claim 5, wherein said applying the test impedance map for the wellbore to the second machine learning processor further comprises sliding windows of the test impedance map.

* * * * *